Patented Nov. 21, 1950

2,531,275

UNITED STATES PATENT OFFICE 2,531,275

POLYMERIZABLE UNSATURATED ESTERS

John Leslie Jones, Toledo, Ohio, assignor to Libbey-Owens-Ford Glass Company, Toledo, Ohio, a corporation of Ohio No Drawing. Application January 26, 1945,
Serial No. 574,821

1 Claim. (Cl. 260—45.4)

The invention relates to compositions of a novel type that can be polymerized to produce useful new infusible resins.

Allyl esters of dibasic acids or monobasic unsaturated acids are known to polymerize to infusible resins. However, it is difficult to produce cast articles by the polymerization of such allyl esters because when cast and polymerized they tend to produce soft gels that harden very slowly. Moreover, such allyl esters tend to discolor during polymerization and such discoloration severely limits the possibilities of commercialization. Another important disadvantage of such allyl esters is their relatively high volatility. It is necessary to heat them to an elevated temperature in order to cause polymerization and their volatility is such that great difficulty is caused by vaporization of the esters during the polymerization process. Such vaporization causes gas bubbles and blisters. These esters are generally so volatile that when they are used in coating compositions they tend to evaporate before polymerization can take place. In all operations in which the esters are used their high volatility makes it difficult to avoid serious losses by evaporation.

An object of the invention is to provide novel compositions that are highly useful for polymerization into infusible resins. More specific objects and advantages are apparent from the description, which discloses and illustrates the invention and is not intended to impose limitations upon the claim.

A polymerizable composition of the present invention, which is capable of conversion to an infusible resin, comprises a polymerizable unsaturated polyhydric alcohol-polycarboxylic acid polyester and a polymerizable monomeric carbon compound that may be considered to be a derivative of an ester of a beta-gamma-olefinic alcohol with a monobasic hydroxy-substituted acid. The invention is based upon the discovery that a certain type of polymerizable derivative of such an ester of a monobasic hydroxy-substituted acid can be prepared which has novel properties that make it extremely advantageous as a starting material for co-polymerization with an unsaturated polyester to form an infusible resin.

In each of the novel polymerizable monomeric compounds to which the present invention relates, a beta-gamma-olefinic alcohol radical is connected by an ester linkage to the acid radical of a hydroxy-substituted monobasic acid that in turn has its hydroxy group esterified to form a connection with the remainder of the molecule.

It has been discovered that this novel method of molecular construction can be used to produce a type of molecule that not only can be co-polymerized with an unsaturated polyester to an infusible resin, but also has a boiling point high enough so that no volatilization occurs during the operations that it is necessary to use in the fabrication of a synthetic resin. This novel method of molecular construction is extremely versatile in that molecules of widely different types may be produced, which may be polymerized to infusible resins which have various properties and which range from rubbery solids to hard glassy transparent solids that are insoluble, infusible and very resistant to chemical attack. From the great variety of synthetic resins that can thus be produced, it is possible to select resins having properties that fit them for many different uses. For example, it is possible to prepare compounds which can be polymerized with great rapidity, and from which colorless, transparent, infusible castings can be produced without difficulty. Thus the present invention obviates the disadvantages of the synthetic resins that have been produced heretofore by the polymerization of allyl esters of dibasic acids or monobasic unsaturated acids. The versatility of this method of molecular construction also makes it possible to prepare polymerizable compounds which are compatible with various substances with which it may be desired to blend them, and which are capable of co-polymerizing with various monomers that are now available commercially. In the practice of the invention, the compound may have a high molecular weight so that the product produced by its polymerization has a very high molecular weight and is therefore inert and resistant to deterioration.

Some of the most useful products embodying the invention are quite inexpensive to produce.

A further advantage of the monomeric compounds of the present invention is that in general they are stable at room temperature without the addition of a polymerization inhibitor.

A monomeric compound which may be used in the practice of the invention is an ester of two molecules that will be described, one of which has a carboxy group and the other of which has an alcoholic hydroxy group. The molecule having a carboxy group has the general formula F—OH, in which F is a monovalent radical selected from the class consisting of z—O—G—, acrylyl, methacrylyl, and alpha-chloracrylyl; G being a divalent radical selected from the class consisting of maleyl, chloromaleyl, bromomaleyl, fumaryl, chlorofumaryl, bromofumaryl, mesaconyl, citraconyl, and itaconyl; and z being a monovalent radical selected from the class consisting of H and alkyl groups containing from one to four carbon atoms. The molecule having an alcoholic hydroxy group consists of the allyl, crotyl, alpha-methyl allyl, methallyl, beta-chloro allyl or beta-methyl crotyl ester of a saturated monohydroxy aliphatic monocarboxylic acid having from two to five carbon atoms, a saturated or mono-olefinic mono-hydroxy straight-chain mono-carboxylic acid having from six to eighteen carbon atoms, or mandelic, atrolactic, cyclohexyl glycolic, biphenylyl glycolic, naphthyl glycolic, hydroxybenzoic, hydroxycyclohexane carboxylic, methyl hydroxybenzoic, methyl hydroxycyclohexane carboxylic, hydroxynaphthoic or hydroxybiphenyl carboxylic acid.

The first step in the preparation of a monomeric compound for use in the practice of the invention may consist in preparing an ester of a beta-gamma-olefinic alcohol with a monobasic hydroxy-substituted, chloro-substituted or bromo-substituted acid. Such an ester is easily prepared by the methods customarily used for preparing other esters. For example, an excess of allyl alchol may be reacted with the acid in the presence of an acid catalyst to produce an ester, the water produced by the reaction and the excess of the alcohol being removed. The ester often can be separated from the excess of the alcohol by fractional distillation. In some cases it may be desirable to use an ester-interchange reaction. For example, since methallyl alcohol is unstable under acid conditions, it is desirable first to prepare a simple ester such as the methyl ester of the acid to be used, and then to prepare the desired methallyl ester by reacting the methyl ester with methallyl alcohol, in the presence of a small amount of sodium as a catalyst, while distilling off the liberated methyl alcohol.

In this first step there may be prepared an ester of any of the following alcohols:

Table 1

CH₂=CH—CH₂—OH
Allyl alcohol

CH₃—CH=CH—CH₂—OH
Crotyl alcohol

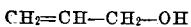
Alpha-methyl allyl alcohol

Methallyl alcohol

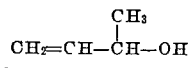
Beta-chloro allyl alcohol

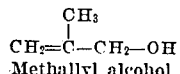
Beta-methyl crotyl alcohol with an acid such as the following:

Table 2

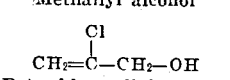
Chloracetic acid

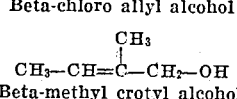
Glycolic acid

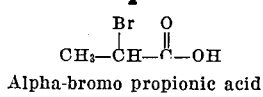
Alpha-bromo propionic acid

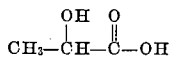
Lactic acid

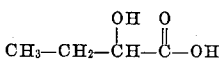
Alpha-hydroxy butyric acid

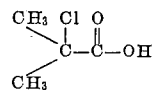
Alpha-chloro isobutyric acid

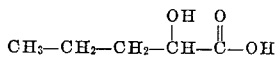
Alpha-hydroxy valeric acid

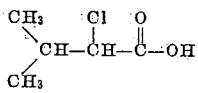
Alpha-chloro isovaleric acid

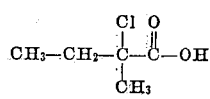
Alpha-methyl alpha-chloro butyric acid

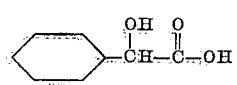
Mandelic acid

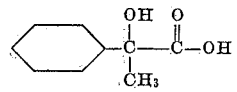
Atrolactic acid

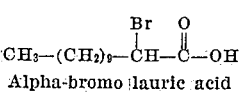
Alpha-bromo lauric acid

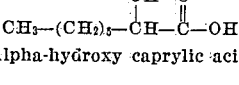
Alpha-hydroxy caprylic acid

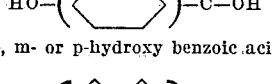
o-, m- or p-hydroxy benzoic acid

Hydroxy naphthoic acid

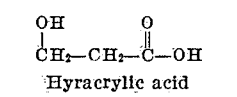
Hyracrylic acid

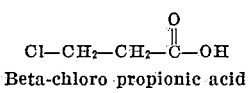
Beta-chloro propionic acid

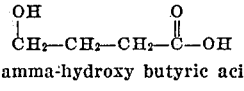
Gamma-hydroxy butyric acid

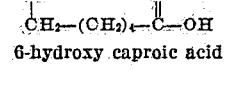
6-hydroxy caproic acid

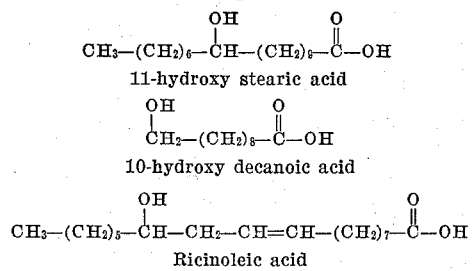

11-hydroxy stearic acid 10-hydroxy decanoic acid

Ricinoleic acid

The enclosure of an aromatic ring or aromatic rings in parentheses in the above table is intended to indicate that any of the various position isomers may be used. In place of mandelic or a hydroxybenzoic acid, an acid that has the same molecular structure except that it contains a cyclohexane ring instead of a benzene ring may be employed. In addition, one of the carbon atoms in the benzene or cyclohexane ring in the hydroxybenzoic or hydroxycyclohexane carboxylic acid that are not otherwise substituted may be methyl-substituted.

Whenever a bivalent radical of cyclohexane (i. e. cyclohexylene) is present, it is to be understood that the two free valencies of the radical may be located at any two carbon atoms in the six-membered ring, either in cis- or in trans-relationship.

The list of acids in Table 2 is not all-inclusive, but is merely illustrative, although some of the acids listed are limiting cases.

In the case of a hydroxy-substituted acid that dehydrates readily, it is desirable to use the corresponding chroro- or bromo-substituted acid.

After the preparation of such an ester, a compound for use in the practice of the invention is prepared by reacting one molecule of the ester with one molecule of a derivative of acrylic, methacrylic, alpha-chloracrylic, maleic, chloromaleic, bromomaleic, fumaric, chlorofumaric, bromofumaric, mesaconic, citraconic or itaconic acid.

If an ester of a hydroxy-substituted acid has been prepared, one molecule thereof may be reacted with one molecule of the chloride of such an acid (with elimination of hydrogen chloride) or in some cases with one molecule of the acid itself (with elimination of water). In some cases the anhydride of one of the dibasic acids last mentioned above may be employed. For example, one molecule of allyl lactate may be reacted with one molecule of maleic anhydride. In the case of the dibasic acids last mentioned, the half methyl, half ethyl, half propyl, half isopropyl or any half butyl ester, or in some cases the acid monochloride of such a half ester may be used for the reaction with the ester of a hydroxy-substituted monobasic acid.

If an ester of an alcohol listed in Table 1 with a chloro- or bromo-substituted acid has been prepared, one molecule thereof may be reacted with one molecule of the monopotassium or monosodium salt of one of the monobasic or dibasic acids last mentioned or with the monopotassium or monosodium salt of one of the half esters last mentioned, the chloride or bromide of potassium or sodium being formed as a by-product of the reaction.

The preferred type of compound for polymerization to produce a resin is an ester of a molecule of an unsubstituted beta-gamma-olefinic alcohol, containing from three to four carbon atoms, with an ester of a molecule of a saturated alpha-hydroxy monocarboxylic acid having from two to three carbon atoms and a molecule of an unsubstituted mono-olefinic carboxylic acid having from two to three carbon atoms in the olefine residue, and having not more than two carboxy groups at least one of which is connected to a carbon atom attached to the double bond and forms a chain with not more than two carbon atoms of the olefine residue in series, not more than one carboxy group being attached to a single carbon atom, and any carboxy group in excess of one being esterified with an unsubstituted saturated alcohol containing from one to four carbon atoms; i. e. which is an ester of a molecule of allyl, methallyl, alpha-methyl allyl or crotyl alcohol with another molecule which is an ester of a molecule of lactic or glycolic acid with a molecule of acrylic or methacrylic acid or of the half-methyl, half-ethyl, half-propyl, half-isopropyl or any half-butyl ester of maleic, fumaric, mesaconic, citraconic or itaconic acid.

Another preferred type of compound is the same as the type of compound last mentioned except that it contains a residue of a hydroxybenzoic acid molecule instead of a lactic or glycolic acid molecule.

A preferred compound of the former type is an ester of an unsubstituted alpha-beta-olefinic monocarboxylic acid having from three to four carbon atoms, of which not more than three form a chain in series, with an allyl ester of a saturated alpha-hydroxy monocarboxylic acid having from two to three carbon atoms; i. e. which is an ester of a molecule of acrylic or methacrylic acid with allyl lactate or allyl glycolate. Another preferred compound of the former type is an ester of a molecule of an allyl ester of a saturated alpha-hydroxy monocarboxylic acid having from two to three carbon atoms with a molecule of an unsubstituted ethylene alpha, beta-dicarboxylic acid, which is an ester of a molecule of allyl lactate or allyl glycolate with a molecule of maleic or fumaric acid. Another preferred compound of the former type is an ester of a molecule of an allyl ester of a saturated alpha-hydroxy monocarboxylic acid having from two to three carbon atoms with a molecule of a half alkyl ester of an unsubstituted ethylene alpha, beta-dicarboxylic acid in which the alkyl radical has from one to four carbon atoms, which is an ester of a molecule of allyl lactate or allyl glycolate with a molecule of the half-methyl, half-ethyl, half-propyl, half-isopropyl, half-n-butyl, half-isobutyl, half-secondary-butyl, or half-tertiary-butyl ester of maleic or fumaric acid.

Polymerization of the present compositions may be carried out in the presence of a suitable catalyst. Peroxide catalysts such as benzoyl peroxide, hydrogen peroxide, succinyl peroxide, acetyl peroxide, peracetic acid and perbenzoic acid are preferred. The amount of catalyst to be used is simply that amount which causes the polymerization to take place at the desired rate. Polymerization may be carried out in the presence of a catalyst at ordinary temperatures, but it is usually more convenient to employ an elevated temperature to expedite the polymerization. The temperature may be any temperature below the decomposition point of the compound being polymerized. Usually the polymerization may be carried out rapidly enough for all practical purposes at temperatures well below the decomposition point.

In carrying out the polymerization it is often desirable to exclude air, as by employing an atmosphere of an inert gas, in order to prevent the development of a yellow color or in order to obviate the retarding effect which air sometimes has upon the polymerization. When the polymerization is carried out at a temperature of about 70° C. to about 80° C. there is usually less danger of coloring than when the polymerization is carried out at a higher temperature, such as 100° C.

Many of the monomeric compounds of the present invention are unique because of their low volatility, which makes them very useful as casting compositions. Such compounds in monomeric or partially polymerized liquid form, after the addition of a catalyst, may be poured into open molds and heated to produce infusible castings. In some cases the monomeric or partially polymerized compounds, in admixture with a filler if desired, may be shaped by ordinary compression molding or transfer molding procedures and polymerized in a hot mold to produce molded articles. In the production of molded or cast articles, plasticizers, lubricants, fillers, pigments and other coloring matter may be incorporated if desired. Many of the present compounds are useful in the formulation of coating compositions. In all of these applications the unique low volatility of the compounds prevents evaporation losses and obviates the formation of blisters, cracks and voids and other difficulties which arise in the fabrication of resins and which are due to the volatilization of monomers such as styrene, vinyl acetate, and methyl methacrylate or the elimination of water of condensation from urea-formaldehyde or phenol-formaldehyde reaction products.

The monomeric or partially polymerized compounds having high boiling points may be used for treatment of textiles followed by polymerization, to produce luster, weighting and other effects without any deleterious effect on the strength of the textile fibers. Compositions containing monomeric or partially polymerized compounds of the present invention may be used as adhesives and as impregnating or laminating compositions for textiles, glass fiber cloth, paper, paper pulp and other materials.

If, in the preparation of a compound which may be used in the practice of the invention, one molecule of a dibasic acid or anhydride is used for reaction with one molecule of the ester of one of the alcohols listed in Table 1 and a hydroxy-substituted monobasic acid, the resulting monomer can be polymerized to produce a composition which contains free acidic groups and therefore is capable of use as a base-exchange resin for purifying solutions.

A very useful hardenable composition embodying the invention comprises one or more polymerizable unsaturated polyesters and one or more of the present monomeric carbon compounds.

A polymerizable unsaturated polyester is prepared by reaction of a polyhydric alcohol with a polybasic acid. It is preferable to employ a dihydric alcohol and a dibasic acid in order to produce a product in which there is maximum esterification of the acid and alcohol radicals without excessive viscosity. Ordinarily it is desirable that the unsaturated polyester be polymerizable into an infusible or high melting point resin so that the proportion of unsaturated components should be such that the polyester contains an average of more than one double bond per molecule; for example, there may be an average of eleven or more double bonds in every ten molecules of the polyester.

The polymerizable unsaturated polyester may be produced by reaction of any desired combination of polybasic acid and polyhydric alcohol. For example, an unsaturated dibasic acid such as maleic, fumaric, itaconic, citraconic of mesaconic acid may be reacted with a dihydric alcohol such as any polymethlene glycol in the series from ethylene glycol to decamethlene glycol, propylene glycol, any butylene glycol, any polyethylene glycol in the series from diethylene glycol to nonaethylene glycol, dipropylene glycol, any glycerol monobasic acid monoester (either in the alpha or beta position), such as monoformin or monoacetin, any monoether of glycerol with a monohydric alcohol, such as monomethylin or monoethylin, or any dihydroxy alkane in which the alcohol radicals are primary or secondary or both, in the series from dihydroxy butane to dihydroxy decane.

Instead of a single polybasic acid, a mixture of polybasic acids may be employed, such as a mixture of an unsaturated dibasic acid with a polybasic acid containing more than two acid radicals, such as citric acid. A mixture of polyhydric alcohols may be employed, such as a mixture of a dihydric alcohol with a polyhydric alcohol containing more than two alcohol radicals, such as glycerol.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyesters. On the other hand, the more nearly equal the molecular proportions of dibasic acid and dihydric alcohol the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

The presence of an inhibitor may be desirable to cause the polyester to remain stable during storage or shipment. Any desired anti-oxidant such as hydroquinone, pyrogallol, tannic acid or any aromatic amine, such as aniline or phenylene diamine may be employed as an inhibitor. Although an inhibitor when present in the polyester stabilizes the polyester during storage, the polyester may be cured without difficulty upon addition of a curing catalyst.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A useful hardened product embodying the invention is the product of the polymerization of a composition comprising one or more polymerizable unsaturated polyesters and one or more of the polymerizable monomeric compounds hereinbefore described. In the production of such a hardened product either the unsaturated polyester or the polymerizable monomeric compound, or both, may be partially polymerized before the two ingredients are mixed, although the polymerization of neither of the two ingredients should be completed before they are mixed.

Although polymerizable monomeric compounds of the type hereinbefore described are in general highly compatible with polymerizable unsaturated polyesters, the ingredients used and their proportions should be such that they form homogeneous compositions, such as a solution or colloidal suspension. In some cases the production of a homogeneous composition may be accomplished by addition of a common solvent such as an alcoholic solvent or an ester solvent. A solution so prepared, or preferably a liquid composition containing no unpolymerizable solvent, may be used, after the addition of any desired modifiers, as a binder in the production of impregnated or laminated products, as an adhesive, as a dressing or crease-proofing agent for textiles, or as an ingredient for enamels or other coating compositions, or may be converted to a foam and then hardened to produce a porous product suitable for use as an insulating material.

A composition embodying the invention is particularly advantageous for the production of castings, because a compound of the type described, when added to a polymerizable polyester, ordinarily forms a solution whose viscosity is less than that of the polyester. The reduction in the viscosity by addition of such compound assists in the elimination of bubbles when the solution is poured into a mold to produce a casting. Often it is convenient to dissolve the catalyst in such compound and then to add to the polyester the solution of the catalyst in the compound. The advantages of a composition embodying the invention in the production of castings arise not only from the relatively low viscosity of the composition, but also from the extremely high boiling point of the compound, which obviates the formation of bubbles during hardening of the casting at elevated temperatures. A composition embodying the invention which is partially polymerized or which contains a polymerizable polyester also is highly advantageous for the molding of articles under pressure. Since the composition is fusible and plastic at relatively low temperatures, it is possible to adjust the amounts of catalyst and inhibiting agent so that hardening at such temperatures takes place at a reasonable rate to allow ample opportunity for shaping and molding the composition. Shaping and molding may be completed at such a temperature, and the shaped composition may then be held at the same temperature while slow hardening takes place, or may be heated to a higher temperature to cause quick hardening. These properties are in contrast to those of urea-formaldehyde, melamine-formaldehyde and phenol-formaldehyde products, which are plastic only at elevated temperatures at which they harden so rapidly that hardening interferes with shaping.

Because of these properties, a composition embodying the invention can be fabricated in an injection molding machine. A supply of the composition may be held in the supply cylinder of the machine at a temperature at which the composition is highly plastic but hardens very slowly, and the mold may be held at a temperature at which the composition hardens rapidly. Under such conditions the mold may be filled rapidly from the supply cylinder by injection of the composition under pressure. The composition may harden so rapidly at the temperature of the mold that the finished hardened piece may be removed almost immediately after the mold has been filled. Thus very rapid automatic operation of the machine is possible. The only difference between such an operation and the ordinary operation of injection molding a thermoplastic material is that in the injection molding of the present composition, the mold is at a higher temperature than the supply cylinder, whereas in injection molding of a thermoplastic material, the mold is at a lower temperature than the supply cylinder.

Thus a composition embodying the invention can be molded as economically as a thermoplastic material. The molding of other heat hardenable products is a much slower and more expensive operation than the molding of a thermoplastic material. When a composition embodying the invention is used in a molding or casting operation, plasticizers, lubricants, fillers, pigments and other coloring matter may be incorporated in the composition if desired.

The preparation of various polymerizable polyesters is described hereinafter in Examples 4 to 15 inclusive. In general, a composition containing both a polymerizable polyester and one of the present monomeric compounds hardens faster than either the polymerizable polyester or the monomeric compound alone. The proportion of one of the present monomeric or partially polymerized compounds in a polymerizable polyester may be varied widely from a very small proportion of the compound to a very preponderant proportion of the compound, but the usual proportion is from about 20 to about 40 parts of the compound for 100 parts of the polymerizable polyester. The presence of the compound greatly increases the hardness and water resistance of the hardened product and the presence of the polyester causes the hardenable composition to polymerize much more rapidly and to be more viscous or resinous so that it is more useful as a molding, coating, adhesive, impregnating or laminating composition.

Example 1

After the addition of 7.5 grams of sulfuric acid to 1500 grams of a 50 per cent aqueous solution of lactic acid, distillation is carried out first at atmospheric pressure and then under vacuum until no further water can be removed. To the residue of about 570 grams, consisting essentially of polylactic acid, is added 2400 grams of allyl alcohol. After 12 hours of refluxing the excess of allyl alcohol is distilled off at atmospheric pressure and refractionated in a packed column to recover the allyl lactate carried over in the alcohol vapor. The crude ester is distilled and then redistilled to produce a 70 per cent yield of allyl lactate. This yield can be increased by recovering and reusing the unreacted polylactic acid remaining in the esterification vessel. A compound embodying the invention may be prepared as follows from the ester so obtained or from any other ester of an alcohol listed in Table 1 with one of the hydroxy substituted monocarboxylic acids hereinbefore described, such as allyl glycolate: To a solution of 0.1 mol of such an ester in about 60 g. of pyridine at 0° to 4° C. is added drop by drop with stirring a solution of 0.11 mol of methacrylyl chloride in about 15 cc. of toluene. A compound embodying the invention, such as clear colorless allyl methacrylyl glycolate having a boiling point of about 115° C. at about 20 mm., may thus be obtained in a yield of about 50% or more. A compound so prepared in the presence of about 1% by weight of benzoyl peroxide and in the absence of air may be polymerized in as little as 20 minutes at 80° C. to produce a hardened product. Allyl methacrylyl glycolate may also be polymerized in about 14 hours at 130–170° C. in an atmosphere of oxygen to produce a very hard colorless transparent product.

Example 2

An ester of one of the alcohols listed in Table 1 with one of the monohydroxy monocarboxylic acids hereinbefore described such as allyl glycolate is mixed with an equimolar proportion of maleic anhydride, and heated for 1 hour on an oil bath at 120° C. A product thus obtained, such as allyl glycolate acid maleate, is substantially nonvolatile. Allyl glycolate acid maleate, which is a pale yellow liquid, forms a hard transparent infusible copolymer with an equal molecular proportion or less of styrene. Copolymerization with a greater proportion of styrene produces a hard white opaque product.

Example 3

Equimolecular proportions of fumaryl chloride and n-butyl alcohol are heated together on a water bath until the evolution of hydrogen chloride ceases, to produce the half ester. An ester of alcohol listed in Table 1 with one of the monohydroxy monocarboxylic acids hereinbefore described such as allyl glycolate, is then added in an equivalent amount and heating on the water bath is again carried out until the evolution of hydrogen chloride ceases. The product may be washed with water and dried. A similar product may be prepared by esterifying an aliphatic monohydric alcohol having from one to five carbon atoms with a compound prepared in accordance with Example 2, but in such a reaction, alcoholysis as well as esterification of such a compound takes place so that the yield of the product is lower.

Example 4

5.4 mols of maleic anhydride and 5.4 mols of diethylene glycol are mixed together in a three-necked flask. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, a polyester is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Example 5

The procedure of Example 4 is employed except that 6 instead of 5.4 mols of maleic anhydride are employed; the diethylene glycol is replaced by 6 mols of ethylene glycol; a slower stream of carbon dioxide is used; and the ingredients are kept on an oil bath at 220° C. for 5½ hours. The resulting polyester is a very thick gum having an acid number of 53.

Example 6

The procedure of Example 5 is employed except that the maleic anhydride is replaced by 5 mols of fumaric acid; the ethylene glycol is replaced by 5 mols of diethylene glycol; and reaction is continued for 8¼ hours. The resulting polyester is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

Example 7

The procedure of Example 4 is employed except that 1.5 instead of 5.4 mols of maleic anhydride and 1.5 instead of 5.4 mols of diethylene glycol are used together with an amount of hydroquinone equal to 0.2 per cent of the weight of the reacting ingredients; and reaction is continued for 6¼ hours. The resulting polyester is a moderately stiff liquid having an acid number of 11.

Example 8

The procedure of Example 4 is employed except that the maleic anhydride is replaced by 1.5 mols of fumaric acid; 1.5 instead of 5.4 mols of diethylene glycol are employed; and the temperature is varied between 200 and 220° C. After the reaction has been continued for 2½ hours, the acid number is 73. After 6 hours, the product is a stiff liquid having an acid number of 41.

Example 9

The procedure of Example 8 is employed except that p-toluene sulfonic acid (1.5 grams) is added to the initial ingredients; and reaction for only 2½ hours instead of 6 hours is required to produce a stiff liquid having an acid number of 41.

Example 10

The procedure of Example 8 is employed except that the fumaric acid is replaced by 3.3 mols of maleic anhydride; 3.0 instead of 1.5 mols of diethylene glycol are used; 1.5 grams of p-toluene sulfonic acid and 1.3 grams of hydroquinone are added to the initial ingredients; and the reaction is carried out for 3 hours to produce a limpid liquid having an acid number of 26.

Example 11

The procedure of Example 10 is employed except that the hydroquinone is omitted; and reaction for 5 hours is required to produce a stiff liquid having an acid number of 28.

Example 12

The procedure of Example 9 is employed except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

Example 13

The procedure of Example 4 is employed except that 2 instead of 5.4 mols of maleic anhydride and 2.1 instead of 5.4 mols of diethylene glycol are used; and the reaction is carried out for 4½ hours to produce a stiff liquid having an acid number of 14.

Example 14

The procedure of Example 4 is employed except that 3 instead of 5.4 mols of maleic anhydride and 3.3 instead of 5.4 mols of diethylene glycol are used together with an amount of hydroquinone equal to .09 per cent of the weight of the reaction ingredients and an amount of p-toluene sulfonic acid equal to 0.18 per cent of the weight of the reacting ingredients; and the reaction is carried out for 4 hours at 200° C. to produce a stiff liquid having an acid number of 10.6.

Example 15

The procedure of Example 12 is employed except that the weight of p-toluene sulfonic acid is equal to 0.18 per cent of the weight of the reacting ingredients; an amount of hydroquinone equal to 0.09 per cent of the weight of the reacting ingredients is added at the start of the reaction; and reaction is carried out at 200° C. for 5 hours to produce a liquid, slightly more viscous than that obtained in Example 14, which has an acid number of 10.1.

Various other embodiments of the invention may be devised to meet various requirements. This is a continuation-in-part of applications Serial No. 477,451, filed Feb. 27, 1943, and Serial No. 517,986, filed Jan. 12, 1944, now U. S. Patents 2,443,915 and 2,462,042, respectively.

Having described my invention, I claim:

A hardenable composition comprising 100 parts of a polymerizable unsaturated polyhydric alcohol-polycarboxylic acid polyester and 20–40 parts of an ester of an unsubstituted alpha-beta-olefinic monocarboxylic acid having from three to four carbon atoms, of which not more than three form a chain in series, with an allyl ester of a saturated alpha-hydroxy monocarboxylic acid having from two to three carbon atoms.

JOHN LESLIE JONES.

REFERENCES CITED

The following references are of record in the file of this patent:

UNITED STATES PATENTS

| Number | Name | Date |
|---|---|---|
| 2,141,546 | Strain | Dec. 27, 1938 |
| 2,370,572 | Muskat et al. | Feb. 27, 1945 |
| 2,379,251 | Muskat | June 26, 1945 |
| 2,407,479 | D'Alelio | Sept. 10, 1946 |